United States Patent [19]
Fellinger et al.

[11] Patent Number: 4,905,207
[45] Date of Patent: Feb. 27, 1990

[54] MEASURING DISTANCES USING A PLURALITY OF FREQUENCIES

[75] Inventors: Michael W. Fellinger, Boulder; Richard J. Shelquist, Longmont, both of Colo.

[73] Assignee: Merrill Engineering Laboratories, Inc., Englewood, Colo.

[21] Appl. No.: 247,412

[22] Filed: Sep. 21, 1988

[51] Int. Cl.$^4$ .............................................. G01S 15/00
[52] U.S. Cl. ...................................................... 367/99
[58] Field of Search .................................. 367/99-101; 342/127

[56] References Cited

U.S. PATENT DOCUMENTS 3,064,234 11/1982 Barrett ................................ 367/100
3,298,024 1/1967 Böhm .................................. 342/127
4,259,734 3/1981 Harmel ............................... 367/101
4,282,589 8/1981 Evetts et al. ........................ 367/100

Primary Examiner—Thomas H. Tarcza
Assistant Examiner—Daniel T. Pihulic
Attorney, Agent, or Firm—Sheridan, Ross & McIntosh

[57] ABSTRACT

Distance measurements are made using two or more signal frequencies. Ultrasonic energy is transmitted from a transducer to an object. Returned ultrasonic energy is received by the transducer and processed to provide an accurate determination of the distance between the transducer and the point on the object receiving the ultrasonic energy. In connection with the processing, a number of relationships are utilized. Using certain of the relationships, a range of integers is determined using high and low frequency ultrasonic energy, as well as propagation time. A time-related phase shift determination is also made for each of the high and low frequencies using certain of the other known relationships. Using a range of distance values and the measured time-related values, an accurate determination of distance from the transducer to the object can be made. In one application, a number of different distance values are obtained to define the surface plane of the object, such as a wheel or tire.

27 Claims, 5 Drawing Sheets

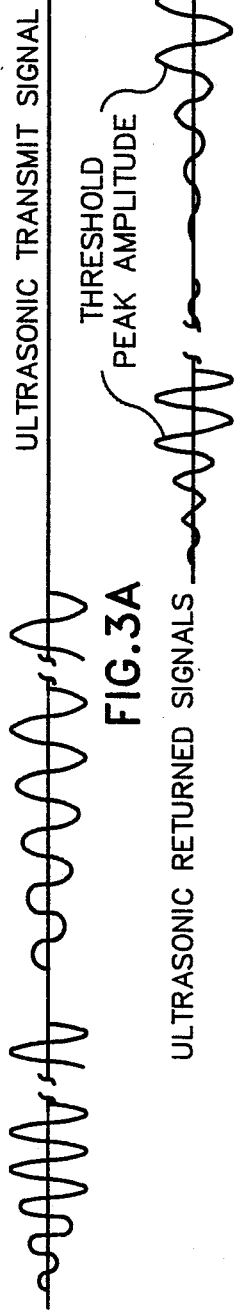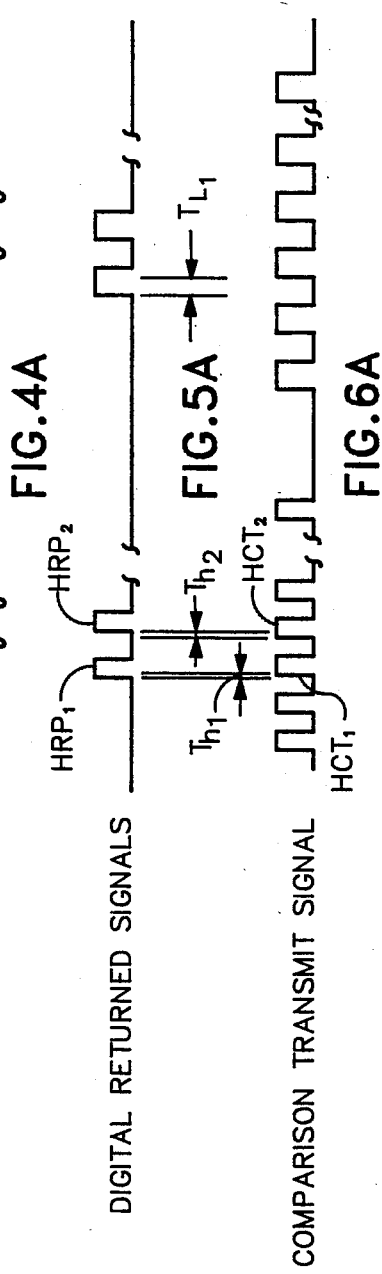

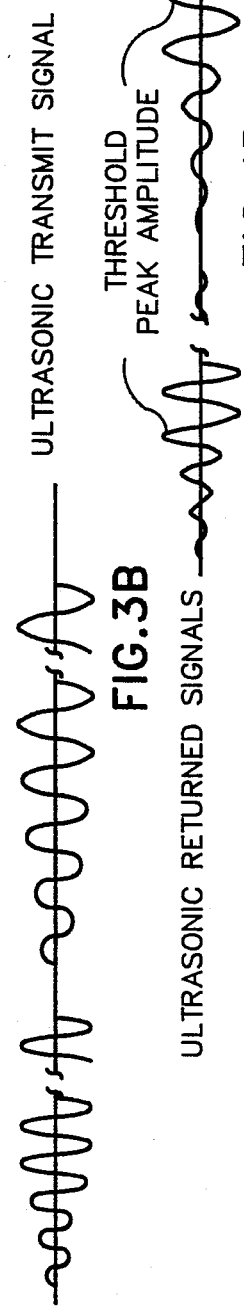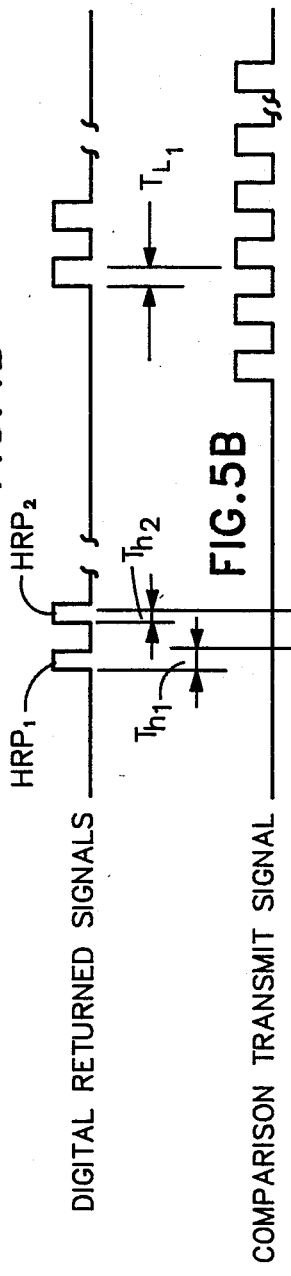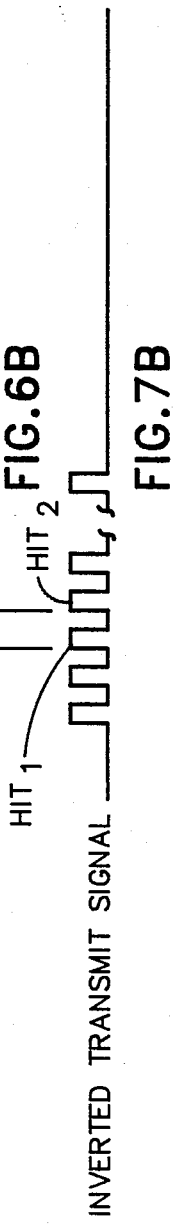
FIG.2B DIGITAL TRANSMIT SIGNAL
FIG.3B ULTRASONIC TRANSMIT SIGNAL
FIG.4B ULTRASONIC RETURNED SIGNALS — THRESHOLD PEAK AMPLITUDE
FIG.5B DIGITAL RETURNED SIGNALS — $HRP_1$, $HRP_2$, $T_{h_1}$, $T_{h_2}$
FIG.6B COMPARISON TRANSMIT SIGNAL — $HIT_1$, $HIT_2$, $T_{L_1}$
FIG.7B INVERTED TRANSMIT SIGNAL

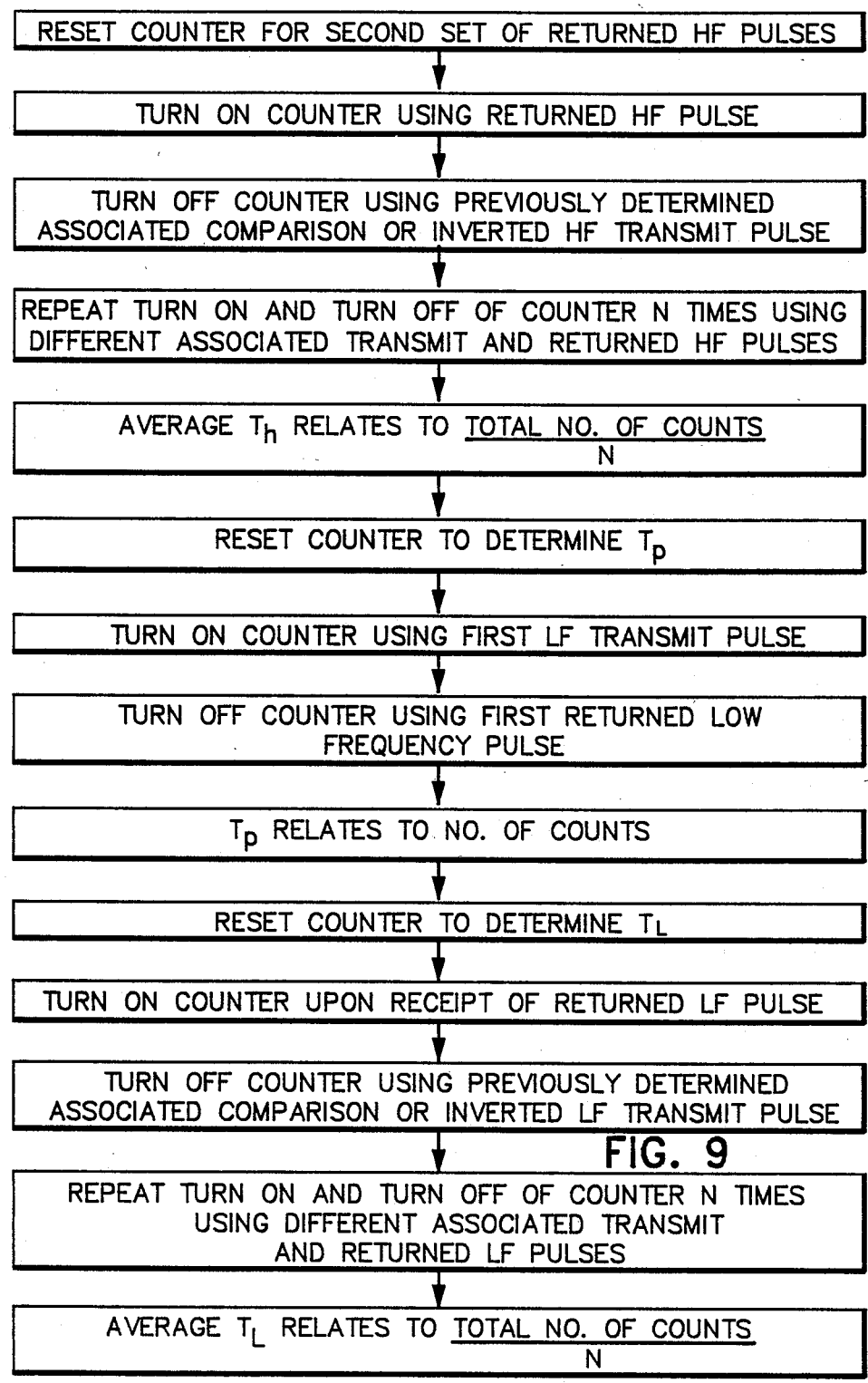

MEASURING DISTANCES USING A PLURALITY OF FREQUENCIES

FIELD OF THE INVENTION

The present invention relates to an apparatus for measuring distances from a source to an object and, in particular, using at least two signals of different frequencies for making distance measurements.

BACKGROUND INFORMATION

It is often desirable to obtain measurements of the distance from a known source to an object, or to points on the surface of an object. In certain applications, such distance measurements are subsequently utilized to provide information concerning the shape of the object or provide a definition of its surface plane With regard to distance measurements, it is known to utilize a plurality of microwave frequencies for determining the distance between a pair of active instruments. Signals having each of the different microwave frequencies are transmitted from a first instrument to a second instrument, which is located at some distance from the first instrument. The second instrument receives and sends back signals having the frequencies of the transmitted signals. In this known system, a mathematical technique is employed that relies on the time between zero crossings of the transmitted and received signals of the same frequency. The mathematical technique involves solving a number of equations to determine certain parameters. The optimum values of such determined parameters are then utilized to determine the distance. There is no determination of a coarse distance between the two instruments and a large number of different signal frequencies are employed so that the hardware used to make the distance determination is very expensive. In another known system, a single frequency signal is used to determine the distance between a source and an object. In this system, a coarse distance measurement is made by relying on the propagation delay between the transmission of the signal and the reception thereof. Additionally, a fine distance measurement is made utilizing the same frequency by relying on zero crossing information associated with the single frequency signal. There is no solving of a number of equations to determine the optimum values of parameters for use in determining the distance.

In addition to these known techniques, a number of patents have been granted which disclose measuring systems that use two or more signals of different frequencies in order to determine the distance to a target or an object. U.S. Pat. No. 4,282,589 to Evetts, et al., issued Aug. 4, 1981 and entitled "Correlation Ranging," relates to a ranging process that transmits and receives ultrasonic signals of different frequencies. The transmission of each signal at a particular frequency is separated from the transmission of other signals having different frequencies by means of a time delay. The apparent purpose of the disclosed process is to enhance return signal detection by distinguishing the return signals from noise and any other extraneous signals. In U.S. Pat. No, 4,259,734 to Harmel, issued Mar. 31, 1981 and entitled "FineResolution, Water-Depth Measuring System," a water depth measuring system is described. In making measurements, two frequencies are utilized to assure that the depth recorder is not confused due to the transmission of a pulse before receipt of the echo of a previous pulse. That is, because at least two frequencies are used, the current and prior pulses can be distinguished. U.S. Pat. No. 3,064,234 to Barrett, issued Nov. 13, 1982 and entitled "Sonar System," relates to an ultrasonic system in which a number of different transducers are employed, with each being designed to oscillate at a different carrier frequency. The purpose noted in the patent for using a number of different frequencies is to eliminate noise from the returned signals. Apparently, signals returning from the target will add together while the noise signals will cancel because they vary in phase and amplitude.

Although many systems have been proposed or developed for measuring distances using ultrasonic signals, it would be advantageous to provide a distance measuring apparatus that rapidly and accurately determines the distance between a source and an object or target and be relatively inexpensive. Preferably, it would be desirable to provide a system that is able to accurately measure a number of points found on the object and rapidly determine the distance between each point and the known source. Even though it is known to employ a number of different frequencies and a mathematical technique for determining the optimum value of a parameter from a number of values, that known system did not utilize ultrasonic signals and an instrument that provided return signals was required, not a passive target or object. Most significantly, the processing time involved in this prior art technique was considerable and did not involve the determination of a coarse distance utilizing one of the plurality of frequencies. The present invention is directed to overcoming such disadvantages while providing an accurate and rapid method for determining the distance between a transducer and one or more points located on a passive object.

SUMMARY OF THE INVENTION

The apparatus of the present invention is directed to measuring a distance from a known source to an object. The apparatus incorporates an approach for measuring distance which is similar to that used by a vernier device. Like the vernier, a coarse distance is found and utilized with a fine distance to provide an actual, measured distance from the source to the object with significant accuracy. In that regard, the coarse distance is obtained using a first signal having a known frequency by measuring the amount of time it takes for a portion of the signal to be transmitted to the object and return to the signal source. Such a coarse distance determination is not accurate, typically in error by more than one wavelength of a signal used to obtain the propagation time. To obtain a fine distance and achieve the desired distance determination accuracy, two fine distance determinations are made using each of two different signal frequencies, with one of the frequencies being the frequency used to obtain the coarse distance. Generally, because there can only be one accurate distance the fine distance obtained using the first signal frequency must equal or correspond to the fine distance found using the second signal frequency. That is, like the vernier in which markings or indicia are aligned for defining a fine distance, an accurate, measured distance is that distance which is the same, or substantially the same, for each of the two fine distance determinations. Stated another way, use of a single frequency to determine the fine distance involves more than one solution as to the magnitude of the fine distance but use of a second frequency enables one to determine the one fine distance that satisfies both frequencies.

In one preferred application, the invention measures or determines a number of distance values from which a plane can be defined. In one application, the plane to be defined is a wheel plane for use in determining the toe and camber of the wheel. In one embodiment, the known source of the apparatus is a single transmitter/receiver transducer for sending and receiving ultrasonic energy to and from an object or target. The object is positioned at some distance from the transducer. Typically, in conjunction with the present invention, a rough or coarse distance is known or can be readily found between the transducer and the object. However, it is desirable to know the distance to an accuracy of about 0.001 inch. To rapidly determine the distance, while achieving this degree of accuracy, the apparatus also includes an oscillator for generating a signal having a predetermined frequency. Because the method of the present invention requires the use of at least two different frequencies, a frequency signal generator communicates with the oscillator for selectively outputting two or more different signal frequencies at desired times. Preferably, two sets of first and second frequency signals are transmitted to the object wherein the first sets are used to determine the relative magnitude of the phase shift between transmitted and received signals. Each of the signal frequencies is applied to driver circuitry, which is used to drive or power the transmitter/receiver transducer. That is, the oscillating signal or pulse waveform having controllable, variable frequencies is inputted to the transducer and ultrasonic signals having such frequencies are outputted therefrom. The ultrasonic signal frequencies are directed and sent to a point on the object. Ultrasonic energy is reflected by the object and some of such energy is returned to and received by the transmitter/receiver transducer.

In a preferred embodiment, the present invention further includes a signal amplitude detector for determining whether or not the peak amplitude of a returned ultrasonic signal is at least equal to a threshold magnitude. If not, such returned ultrasonic energy is not processed or utilized. The signal amplitude detector is operatively associated with a zero crossing detector. The inputted ultrasonic signal is converted to a digital pulse waveform by the zero crossing detector. The information contained in this output is utilized by processing electronics and software for determining the distance from the transducer to the object point.

More specifically, the processing logic uses the pulse waveform representing returned ultrasonic energy to calculate a number of parameters, which are then used in a number of relationships to determine distance. In particular, the processing includes the determination of the coarse propagation time, which relates to the time taken by the signal of a known frequency to be transmitted to the object and then returned to the transmitter/receiver transducer. This is a rough or coarse measurement because of an ambiguity which is normally introduced during the propagation time. That is, because the returned ultrasonic signal is usually out-of-phase relative to the transmitted ultrasonic signal of the same frequency and also because all cycles of the transmitted signal are not received or processed since the reflected ultrasonic signal includes attenuated or dissipated signal portions, the measured propagation time is typically accurate to within a few cycles of the periodic returned signal, such as about +4 or +5 cycles. Since it is necessary to resolve this ambiguity in order to obtain the desired degree of accuracy, the present invention incorporates further processing steps. In addition to the propagation time, and for each of at least two signal frequencies, a measurement or determination of the phase difference is made between the transmitted and received pulses. The case in which one frequency is designated as the high frequency and the other of the two frequencies is designated as the low frequency, this phase difference or time is found for each of these two high and low frequency signals. Using these two time measurements, together with the determined propagation time, the processing hardware and software uses a number of relationships for determining the distance. That is, in the preferred embodiment in which two different frequencies are employed, there are four relationships defined for use in determining the magnitude of the distance. An iterative mathematical technique is employed to determine the distance value using the known wavelength of the two frequencies and the range of possible values for the distance.

In view of the foregoing summary, a number of advantages of the present invention are readily discerned. A distance measuring apparatus and method are provided that rely on a plurality of signal frequencies from which a coarse distance to the target can be found and two fine distance-related determinations are made to achieve a high degree of accuracy, i.e., a distance measurement of within about 0.001 inch of the actual distance between a known source and a point on an object. The processing of information to make the distance determination is relatively rapid because the apparatus utilizes both a coarse distance determination and the fine distance determinations. In one embodiment, the processing is more rapidly accomplished because the distance measurement can be made utilizing only two different frequencies, instead of more frequencies which would require an even greater number of functional relationships to be solved. The inventive apparatus also does not require the use of an active instrument as the receiving object, but is capable of measuring distances to any one of a number of passive targets, including vehicle wheels. The present invention also utilizes ultrasonic signals in order to obtain the necessary information for processing to make the distance measurements. Additionally, a check is made to determine the relative magnitude of phase shift between transmitted and received signals in order to enhance the accuracy of the fine distance measurement.

Additional advantages of the present invention will become readily apparent from the following discussion, when taken in conjunction with the accompanying drawings.

BRIEF DESCRIPTION OF THE DRAWINGS

FIGS. 2-7 illustrate waveforms generated by the present invention and timing relationships among certain of the waveforms; and FIGS. 8 and 9 are diagrams outlining steps associated with the determination of the magnitudes of propagation time and phase shifts for high and low frequency signals.

DETAILED DESCRIPTION OF THE EMBODIMENTS

Figure 1:
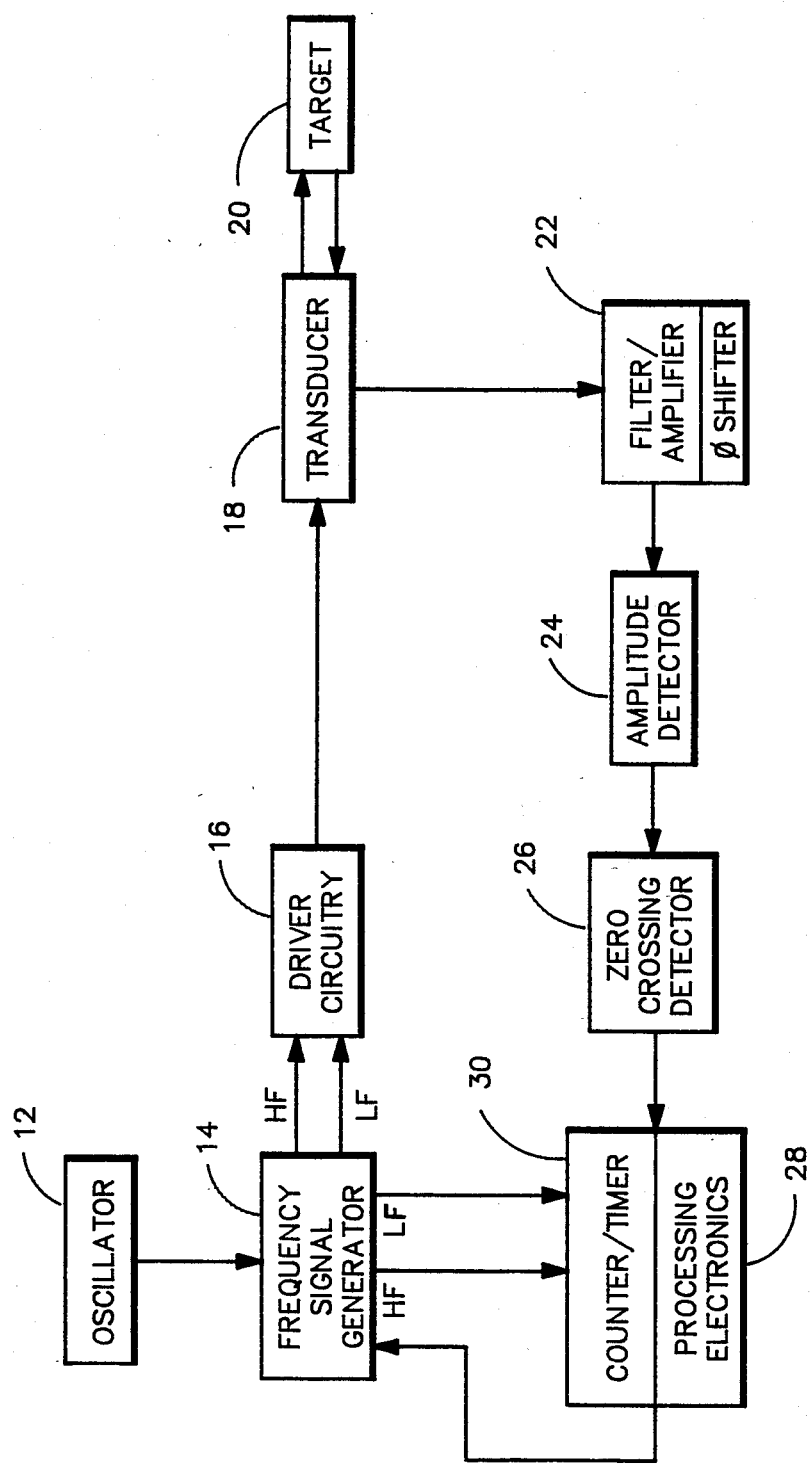
FIG. 1 is a block diagram of the apparatus of the present invention.

In accordance with the present invention, an apparatus is provided for determining, with a relatively high degree of accuracy, the distance between the apparatus and a selected target or object. The invention is characterized by the use of first and second signals, preferably ultrasonic, and with the first ultrasonic signal having a frequency greater than the second ultrasonic signal. The use of two frequencies enables the apparatus to integrate a "fine distance" determination with a "coarse distance" determination. The coarse distance relates to the effective propagation time taken by one of the two ultrasonic signals to traverse the round trip from the apparatus to the target and back to the apparatus. The round trip distance based on propagation time is accurate to a limited degree, i.e., about +4 or +5 cycles. To achieve a higher degree of accuracy, phase shift determinations are made for each of the two ultrasonic signals to provide a fine distance determination. In particular, with respect to the relatively high frequency (HF), the magnitude of the phase shift between the transmitted ultrasonic signal and the high frequency ultrasonic signal returned from the target is determined. Similarly, the magnitude of the phase shift between the transmitted low frequency ultrasonic signal and the low frequency (LF) ultrasonic signal returned from the target is determined. The magnitude of the propagation time, magnitude of the phase shift between transmitted and returned high frequency signal and magnitude of the phase shift between the transmitted and returned low frequency signal are used in four separately defined relationships to determine the distance between the apparatus and the target.

The four relationships or conditions that are solved simultaneously are:

$$N < V_s \times T_p / L_h \quad (1)$$

$$M < V_s \times T_p / L_L \quad (2)$$

$$2D = V_s \times T_h + N \times L_h \quad (3)$$

$$2D = V_s \times T_L + M \times L_L \quad (4)$$

Briefly, the relationships set forth in (1) and (2) provide an approximate number of integral signal cycles taken in transmitting and receiving the signal back from an object. The relationships set forth in (3) and (4) relate to the phase shift, within one wavelength, between the transmitted and received signal. There can be only one consistent, simultaneous solution, i.e., distance, that satisfies the relationships (1)-(4).

More specifically, with regard to the relationship defined in (1), this expression indicates that there is an integral or whole number of high frequency cycles $N$ that were transmitted or generated during the time taken by a first or identified one of the high frequency cycles to be transmitted to the target and to be returned to the apparatus. The integer N is unknown but is less than or equal to the functional relationship set forth in (1) where the term $V_s$ represents the velocity of sound, the term $T_p$ represents the propagation time and can be measured by the apparatus and the term $L_h$ represents the known wavelength of the high ultrasonic frequency signal. With respect to the possible or range of values of the integer N, based on experiment, for example, the possible N values only include the value of N determined from relationship (1) and the next, preceding 3 or 4 integers, which are less than the determined N, in the case in which the high frequency is about 41 kHz. This determination of N will be discussed further in connection with the description herein of the "Example" associated with the operation of the present invention.

With reference to the relationship defined in (2), it is similar to (1) in that it indicates that there is an integral or whole number of low frequency cycles M that were transmitted or generated during the time taken by a first or identified one of the low frequency cycles to be transmitted to the target and to be returned to the apparatus. The integer M is unknown but is less than or equal to the functional relationship set forth in (2) where, like in (1), the term $V_s$ represents the velocity of sound, the term $T_p$ represents the propagation time and can be measured by the apparatus, and similar to (1), the term $L_L$ represents the wavelength of the low ultrasonic frequency signal. With respect to the possible or range of values of the integer M, based on experiment, for example, the possible M values only include the M value determined from expression (2) and the next, preceding 3 or 4 integers, which are less than the determined M, in the case in which the low frequency is about 37 kHz. As with N, the determination of M will be discussed further in the "Example" section.

With regard to relationship (3), this reflects the round trip distance as a function of the phase shift between transmitted and returned high frequency ultrasonic signals. As with relationships (1) and (2), the speed of sound $V_s$ is known. The magnitude of the phase shift $T_h$ in terms of units of time is determined by the present invention. The term $L_h$ is known once the magnitude of the high frequency is identified since the magnitude of $L_h$ corresponds to the wavelength of the selected high frequency. In relationship (3), the two unknowns are the distance D and the term N, which is to be found using relationship (1).

With regard to relationship (4), the round trip distance is a function of the magnitude of the phase shift between the sent and received ultrasonic low frequency signal. Like equation (2), the speed of sound $V_s$ and the wavelength of the low frequency signal are known. The magnitude of the phase shift, in terms of time units, can be determined. The unknowns are the distance D between the apparatus and the target and the term M, which is to be found using relationship (2).

As can be readily understood, expressions (3) and (4) rely on the fact that an integral or whole number of signal cycles or periods can be defined or determined, during which number of frequency cycles a single cycle is transmitted to the target, reflected by the target, and returned to the apparatus. Because only a range of N and M values can be defined, an iterative technique utilizing a number of N and M integer values is employed to determine the distance D with a relatively high degree of accuracy. This will be discussed and explained further in connection with the Example of the operation of the present invention.

With reference to FIG. 1, the apparatus of the present invention is illustrated in block diagram form. The apparatus includes an oscillator or clock 12 which outputs a periodic digital waveform to a frequency signal generator 14. The frequency signal generator 14 may be a common divider circuit, which is capable of outputting signals of different frequencies. In one embodiment of this invention, the frequency signal generator 14 outputs first and second digital pulse waveforms or signals, which are used to drive a transmit/receive ultrasonic transducer. The first signal can be defined as a high frequency signal and the second signal can be defined as a low frequency signal. The terms "high" and "low" are intended to mean that the frequency of the high frequency signal is greater than the frequency of the low frequency signal and, concomitantly, the frequency of the low frequency signal is less than that of the high frequency signal. These two digital signals are used in making important time measurements relating to the distance that the apparatus is positioned relative to a target, as will be explained in the description of the operation of the present invention. The two digital signals outputted by the frequency signal generator 14 are each applied to driver circuitry 16, which is used in driving the transmit/receive transducer 18. In one embodiment, the driver circuitry 16 provides an outputted signal having a peak-to-peak amplitude of about 140 volts. The transducer 18 generates an ultrasonic signal using the inputted digital signal outputted by the driver circuitry 16. In the case of a high frequency digital signal received by the transducer 18, a high frequency ultrasonic signal is outputted by the transducer 18 and transmitted or directed to a target 20. Similarly, when the frequency signal generator 14 is outputting the low frequency digital signal, with the transducer 18 in its transmit mode or state, the transducer 18 generates low frequency ultrasonic signals for transmission to the target 20. During the time that returned ultrasonic signals are being received by the transducer 18, the transducer 18 is not being driven or powered to generate ultrasonic signals. Stated another way, the transducer 18 only transmits or, alternatively, only receives ultrasonic signals at any instance in time.

As can be readily appreciated, instead of a single transducer 18 that both transmits and receives, but at different times, a pair of transducers could be utilized. In such a case, a first transducer would be used in transmitting ultrasonic signals, while a second transducer would be used in receiving ultrasonic signals returned from the target 20. In the case of separate transmit and receive transducers, no delay is necessary between bursts of transmitted ultrasonic signals in order to permit the transducer to receive returned ultrasonic signals.

With regard to ultrasonic signals reflected by the target 20 and received b the transducer 18, they are directed to filter/amplifier and phase shifter circuitry 22. The circuitry 22 acts to filter out unwanted signals for the purpose of passing only signals that have the selected high or low frequency. In the case of returned ultrasonic high frequency signals, for example, the filter acts to pass only such signals. The circuitry 22 also amplifies the returned ultrasonic signal to a desired level for further processing.

The circuitry 22 also provides a phase correction stage for taking into account any phase shift that might occur in the apparatus itself and which is not attributable to the distance determination. More specifically, it can often occur that an unwanted time delay may be introduced by the circuitry, which can be exemplified by a different time delay when using the high frequency than when using the low frequency, even though the object is located at the same distance from the transducer during transmission and receipt of both frequencies. To overcome this type of inherent problem, one solution is to precisely identify a distance to a known target and then measure the distance using the apparatus. Any difference between the known distance and that distance determined by the apparatus is due to the unwanted, inherent phase shift. Once the magnitude thereof is known, the phase shifter of the circuitry 22 is implemented to take care of the unwanted shift. In the embodiment implemented, the unwanted phase shift was compensated for using computer software.

The output of the filter/amplifier circuitry is sent to an amplitude detector or limiter 24. The amplitude detector 24 outputs only analog signals having at least a predetermined threshold peak amplitude. In this manner, the amplitude detector 24 is selective in outputting a sinusoidal signal having a desired peak amplitude. Such a sinusoid represents the received ultrasonic energy returned from the target 20 to the transducer 18.

The output of the amplitude detector 24 is transmitted to a zero crossing detector 26 or the like, such as a phase locked loop, for providing a digital pulse waveform or signal corresponding to the returned sinusoidal signal. That is, the digital signal generated by the zero crossing detector 26 has the same phase as the inputted analog signal. Basically, the zero crossing detector 26 detects the zero crossings of the inputted sinusoid and develops pulses utilizing the zero crossings, i.e., the leading and trailing edges of the digital pulses correspond to zero crossings of the inputted sinusoidal signal.

The digital signal outputted from the zero crossing detector 26 is applied to processing electronics 28 including a counter/timer 30. The processing electronics 28 would also typically include one or more processing chips or a microprocessor and/or appropriate software for making the necessary calculations in determining the distance between the transducer 18 and the target 20 using the gathered data, as well as controlling various operations that are required in obtaining the data to make the necessary calculations.

To better understand the operation of the processing electronics 28 and the counter/timer 30, a discussion of the operation of the present invention is provided. During the discussion of the operation, reference will be made to the signal waveforms illustrated in FIGS. 2-7, together with the diagrams of FIGS. 8 and 9, which identify steps taken in the determination of the distance between the transducer 18 and the target 20.

As previously explained, the method of the present invention involves four different but related mathematical expressions. In order to utilize these expressions, it is necessary to obtain or gather data relating to the distance between the transducer 18 and the target 20. In particular, the magnitudes of the following terms must be obtained: $T_h$ - the magnitude of the phase shift in units of time between the high frequency signal transmitted to the target 20 and the high frequency signal returned from the target 20; $T_p$—the coarse time or effective propagation time taken by a predetermined cycle of one of the transmitted signals to traverse the round trip distance from the transducer 18 to the target 20; $T_L$—the phase shift in units of time between the transmitted low frequency signal and the returned low frequency signal from the target 20.

In obtaining this information or data, in one preferred embodiment of the invention, for each of the two signal frequencies, two signal bursts are utilized. That is, a first set of high and low frequency signals is directed at the target 20 and then a second set of high and low frequency signals is directed at the target 20. The purpose of utilizing two sets of high and low frequency signals is to better assure an accurate determination of the needed phase shift values, as well be explained subsequently in greater detail.

In connection with the first set of high and low frequency bursts, reference is made particularly to FIGS. 2A–7A. Further, in describing the operation of this embodiment, the high frequency signal has a frequency of 41 kHz and the low frequency signal has a frequency of 37 kHz, although other values of high and low frequency could be utilized. With regard to the number of cycles or pulses in a single burst, this also can vary; however, in one embodiment, the number of high frequency pulses in a single burst is 256, and the number of low frequency pulses in a single burst is also 256 pulses. Additionally, each of the frequencies could be modulating a carrier frequency.

The first burst of high frequency pulses is outputted by the frequency signal generator 14, under the control of the processing electronics 28. This first burst of high frequency pulses is applied to the transducer 18 through the driver circuitry 16. The transducer 18 outputs a first burst or packet of ultrasonic signals directed at the target 20. After a short delay at the end of the transmission of the last pulse or cycle of the first high frequency burst, the frequency signal generator 14, under the control of the processing electronics 28, outputs a first burst of low frequency pulses. This first burst of low frequency pulses is applied to the transducer 18 through the driver circuitry 16 whereby low frequency ultrasonic signals are directed towards the target 20. FIG. 2A illustrates the first burst of high frequency pulses, a relatively short delay at the end of the last high frequency pulse of the first burst, and the first burst of low frequency pulses, both of which bursts are applied to the transducer 18. FIG. 3A represents the generated sinusoidal ultrasonic signal outputted by the transducer 18 for each of the two high and low digital signal bursts. After the first set of high and low frequency signals has been transmitted towards the target 18, there is a delay before the second set of high and low frequency signals is transmitted. Specifically, in order to permit the transducer 18 to receive reflected ultrasonic signals, the transducer 18 must be switched from its transmit mode to its receive mode during the time that reflected ultrasonic energy is expected to be received by the transducer 18. As can be easily understood, the delay between the transmission of sets of high and low frequency signals must be long enough to permit receipt by the transducer 18 of returned high and low ultrasonic frequency signals.

In that regard, FIG. 4A represents returned ultrasonic signals outputted by the filter/amplifier and phase shifter circuitry 22. As can be seen in FIG. 4A, the initial and trailing ends of the ultrasonic signals for both high and low frequency are noticeably less in amplitude than substantial major portions of the returned ultrasonic signals. The attenuated or dissipated portions of the returned ultrasonic signal are expected and are not utilized in obtaining the necessary data as will be explained further herein. The signal represented in FIG. 4A is inputted to the amplitude detector or limiter 24 and the output therefrom is applied to the zero crossing detector 26. Because the amplitude detector 24 requires that the inputted analog signal reach a predetermined peak amplitude before being passed as a corresponding digital pulse or waveform, not all cycles of the returned ultrasonic signals will be represented by the digital output of the zero crossing detector 26. Threshold peak amplitudes for the high and low frequencies are denoted in FIG. 4. The signal cycle(s) that do not meet or exceed this threshold will be rejected. In the case of the examples of FIG. 4A, the zero crossing detector 26 does not output pulses representing the signal portions prior to the peak amplitude threshold being reached. Consequently, the number of pulses in a returned signal of one or both of the high and low frequency signals is less than or equal to the number of transmitted pulses. This result does not hinder an accurate distance determination as will be better understood from the subsequent description of an example of the method of the present invention. With respect to FIGS. 4A and 5A, and representative of what might happen, the first three pulses of each of the high and low frequency signal bursts transmitted to the target 18 are not represented in the digital return signal outputted by the zero crossing detector 26.

Figure 8:
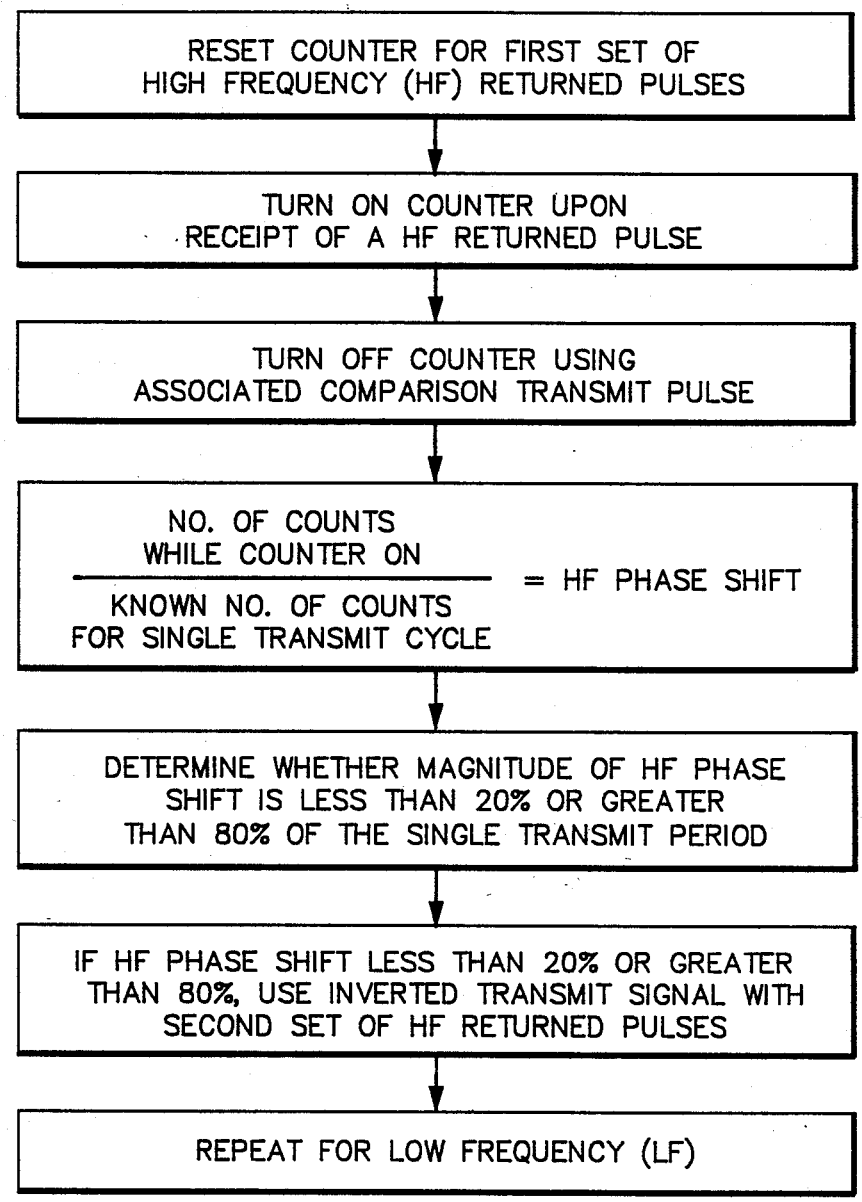

In continuing the discussion, specific reference is made to the step diagram of FIG. 8, which outlines steps relating to the determination of $T_p$, $T_h$, and $T_L$. This diagram outlines steps that are used to ensure that relatively accurate data is obtained for determining the necessary phase shifts. An inaccuracy can be introduced in determining one or both of the average high and low frequencies phase shifts when one or more of the phase shifts being averaged is nearly in phase with the transmitted signal, for example, the difference in time being between the occurrence of the leading edge of a returned pulse and the leading edge of its next-in-time associated transmit pulse. In such cases, because an average of a number of phase shift magnitudes for one signal frequency burst is used, such averaging may result in a highly inaccurate phase shift determination. For example, it can occur that the leading edge of a pulse for one cycle of the returned signal leads its associated or corresponding pulse of the transmit signal by a relatively small phase shift; while a leading edge of another pulse of this same returned signal lags the next-in-time or associated transmit pulse by a relatively small phase shift, which lag occurrence constitutes a great phase shift for purposes of the averaging.

The comparison transmit signal is illustrated in FIG. 6A and is identical to the digital transmit signal used to produce ultrasonic signals. Both the transmit signal and the comparison transmit signal are outputted by the frequency generator 14. An example in the high frequency signal of a return pulse ($HRP_1$) leading the next-in-time or its associated comparison transmit pulse by a relatively small phase shift magnitude ($T_{h1}$) and a return pulse ($HRP_2$) lagging its associated comparison transmit pulse by a relatively small phase shift magnitude ($T_{h2}$) is seen in FIGS. 4A and 5A. If these two phase shifts are averaged, the resultant value would indicate that the leading edge of the return pulses is about one-half cycle out-of-phase relative to the leading edge of associated, comparison transmit pulses. This is not the case because, in fact, the leading edges of return pulses are much closer in time to transmit pulses than the resultant or average phase shift value indicates.

To overcome this problem, in one embodiment, a relative phase shift determination is made for each of the returned high and low frequency signal bursts. That is, if the relative phase shift is less than 20%, or greater than 80%, of the total phase shift (180°), a comparison is then made between the returned signal and an inverted transmit signal in order to determine the magnitude of the phase shift. The inverted transmit signal is illustrated in FIG. 7A. For each of the high and/or low frequency signal, whichever might be applicable, the inverted transmit signal corresponds to the signal outputted by the frequency signal generator 14, but shifted 90°. Consequently, when a comparison is made between the returned and transmit signal, in situations in which the returned signal is outside of this 20%-80% window, the comparison is still caused to be made within such a window. Subsequently, in order to arrive at an accurate average phase shift, the 180° shift introduced by the inverted transmit signal must be removed or taken into account before the averaging step is performed.

With further reference to FIGS. 5A, 6A and 7A, it is illustrated that the leading edge of $HRP_1$, leads the leading edge of its comparison transmit pulse ($CT_1$), by less than 20% of the cycle time for one period of the comparison transmit signal. $HRP_2$ leads the leading edge of the next and associated transmit pulse ($CT_2$) of the comparison transmit signal by greater than 80% of the cycle time. When such a situation occurs, the digital pulse waveform from the frequency signal generator 14 is inverted and this inverted signal is used in making the comparison with the returned signal to determine the magnitude of the phase shift. The pulses of the inverted transmit signal of FIG. 7A are 90° out-of-phase relative to the pulses of FIG. 6A. With regard to the low frequency bursts of FIGS. 5A and 6A, the returned pulses are illustrated as being within the 20%-80% window. Consequently, the comparison transmit signal is to be used to determine phase shift (e.g. $T_{L1}$), and not the inverted transmit signal. After a determination, for each of the high and low frequency signals, of whether or not an inverted transmit signal should be used in determining phase shift, the second set of high and low frequency signals can be analyzed.

Before proceeding to a discussion of the second set of high and low frequency signals, reference is made to the diagram of FIG. 8. As can be understood, the diagram outlines the steps taken by the apparatus in connection with receipt of the first set of returned pulses. The counter of the counter/timer 30 is reset upon determination that the first set of returned high frequency pulses is being received. The counter is then turned on when it is determined that a leading edge of a returned pulse is received. This counter begins to count and continues to count until the next- in-time and associated pulse corresponding to a transmit pulse is received from the frequency signal generator 14. The number of counts developed by the counter is divided by the total number of counts that occur for a single transmit period. The number of counts for a single transmit period for each of the selected high and low frequencies is known and stored for use by the processing electronics 28. By means of this division, the magnitude of the phase shift can be determined. Subsequently, a comparison is made to determine whether or not the magnitude of the phase shift is less than 20% or greater than 80% of the single cycle time. If so, the inverted transmit signal is to be used to determine the magnitude of the phase shift using the second set of high frequency returned pulses. As the diagram of FIG. 8 indicates, the foregoing steps are then repeated for the low frequency returned pulses to determine whether or not an inverted transmit signal is to be compared to the second set of low frequency return pulses. In the illustration of FIGS. 4–7, it is determined that the high frequency phase shift is outside of the window. Consequently, the inverted transmit signal will be used to determine phase shift for the high frequency burst. The low frequency phase shift is within the predetermined window. Consequently, the comparison transmit signal will be used to determine phase shift for the low frequency burst.

In connection with the determination of whether or not the inverted transmit signal should be employed, it should be kept in mind that an average of a number of phase shifts is not obtained because such an average would essentially defeat the purpose of determining whether or not the phase shift is less than 20% or greater than 80% of the cycle time. Consequently, this determination is made using only one leading edge of a returned pulse and its next-in-time, associated leading edge of a transmit pulse.

During the time that the steps are made to check whether or not the inverted transmit signals are to be used, the second burst of high and low frequency signals are being transmitted to and/or received from the target 20 using the frequency generator 14, under the control of the processing electronics 28. The second set of high and low transmit signals developed by the frequency signal generator 14 is illustrated in FIG. 2B. The resulting transmitted ultrasonic high and low frequency signals are represented in FIG. 3B. The returned ultrasonic signals are illustrated in FIG. 4B, with the initial and trailing cycles of the returned ultrasonic signals being somewhat dissipated in amplitude in comparison with the substantial majority of the high and low frequency signals, as was the case with the first set of signals. FIG. 5B represents the output of the zero detector 26 in which the leading and trailing edges of the pulses of FIG. 5B correspond to the zero crossings of the returned ultrasonic signals. The signals have been filtered and amplified by the filter/amplifier 22 and the initial and trailing cycles of the returned waveform have been removed since the peak amplitudes of such cycles are not equal to or greater than the predetermined threshold peak amplitude.

With regard to the high frequency signal, the digital waveform illustrated in FIG. 5B is compared with the signal corresponding to the inverted transmit signal, as illustrated in FIG. 7B to determine high frequency phase shift. More specifically, with reference also to the diagram of FIG. 9, the counter/timer 30 of the processing electronics 28 is reset upon determination that the second set of returned high frequency pulses is being received by the apparatus. Subsequently, the counter is turned on using the leading edge of a returned high frequency pulse. The counter is turned off upon receipt of the next-in-time, associated high frequency inverted transmit pulse. In order to obtain an average $T_h$, the steps of turning on and turning off the counter are repeated a predetermined number of times, e.g., ten times. The total number of counts for the predetermined number of times is divided by the number of times that different returned and associated inverted transmit pulses are utilized. From this, the average number of counts can be found and the average $T_h$ can be determined.

In determining the magnitude of the phase shift by this averaging technique, it is also preferable to check each magnitude of $T_h$ to determine whether it should be included in the average. Such verification can be done by methods known to one of ordinary skill in the art.

In one embodiment, the propagation time is next determined using the transmitted and returned low frequency signals. In such a case, the counter/timer 30 is reset and is turned on with the transmission of the first pulse of the second burst of low frequency pulses and with the detection of the leading edge thereof. The counter is turned off upon receipt of the return of the first detected pulse of the returned low frequency signal. The number of counts counted by the counter/timer 30 roughly corresponds to the propagation time $T_p$ taken to traverse the round trip path between the transducer 18 and the target 20. As previously noted, it is an approximation because there can be no assurance that the returned pulse, which turned off the counter, is the same as or corresponds exactly to the pulse that was transmitted towards the target 20, due to the dissipation of the returned ultrasonic signal. Similar to the phase shift associated with the high frequency signal, the number of counts counted between sending and receiving of a pulse directly relates to the propagation time. Like the average $T_h$, the determined value of $T_p$ is stored for later use in the determination of the distance between the transducer 18 and the target 20.

It should be understood that the high frequency signals could be utilized in determining the propagation time. The determination of the propagation time could also be made before the determination of the phase shift associated with the high frequency signal or, alternatively, could be made after the determination of the phase shifts for both high and low frequency signals. The determination of the propagation time need not necessarily utilize the first pulse of the burst of pulses; rather, another one of the pulses of the burst of pulses could be utilized, so long as that pulse is identified and its location kept in memory.

With regard to the determination of the phase shift associated with the low frequency signal, as with the high frequency signal, the counter/timer 30 is reset and is turned on when the leading edge of a returned pulse is detected. The counter/timer 30 is turned off upon detection of the leading edge of the next-in-time, associated comparison transmit pulse provided by the frequency signal generator 14. In the case of the low frequency signal, to determine phase shift the comparison is made between the returned pulses and the comparison transmit signal pulses. Like the determination of the average phase shift relating to the high frequency signal, the counter is turned on and off a number of times using different returned pulses and their respective and associated comparison transmit pulses to obtain an average low frequency phase shift $T_L$.

After determining $T_p$, $T_h$, and $T_L$, the round trip distance can be computed using the processing electronics 28, in combination with appropriate software. The processing that is done to determine the distance D can be best understood from the following example.

EXAMPLE

In connection with this example, the following information is known:
(a) The speed of sound = 1125 ft/sec.
(b) The target is approximately 17.5 in. from the transducer so that the total path length or round trip distance is approximately 35 in.
(c) The frequency of the high frequency signal = 41 kHz and has a wavelength of 0.3292682 inch (nominal temperature).
(d) The frequency of the low frequency signal = 37 kHz and has a wavelength of 0.3648648 inch (nominal temperature).
The values obtained from the counter/timer are:
(a) The phase shift of the high frequency signal = 7.25 microseconds ($T_h$).
(b) The phase shift of the low frequency signal = 25.0 microseconds ($T_L$)
(c) The propagation delay = 2593 microseconds ($T_p$), with an uncertainty of $\leq 5$ counts/37 kHz (the $T_p$ measurement in this example relies on the time between the sending of the first transmit pulse and the receipt of the first measured return pulse of the second burst of low frequency pulses).

The foregoing known and determined data can be incorporated into the relationships (1)–(4) as follows:

$$N < 41 \text{kHz}(2593 \text{microseconds}) = 106 \quad (1)$$

$$M < 37 \text{kHz}(2593 \text{microseconds}) = 95 \quad (2)$$

$$2D = 0.097875 + N \times 03292682 \text{ inches} \quad (3)$$

$$2D = 0.3375 + M \times 0.3648648 \text{ inches} \quad (4)$$

From expression (1), the value of N can be from 102 through 106, where N is the whole number of cycles of the high frequency signal that would be counted during the time it takes for a signal cycle to make the round trip between the transducer 18 and the target 20. From expression (2), the magnitude of M can be from 91 through 95, where M is the total number of low frequency pulses that would be counted during the time that a single signal pulse makes the round trip between the transducer 18 and the target 20. Using the processing electronics 28 and appropriate software, all of these possibilities can be examined. Based on the examination of such possibilities, there will be one possibility with minimum error.

The table of possibilities for the foregoing values is as follows:

| | |
|---|---|
| N = 102; D = 33.683231 | M = 91; D = 33.540196 |
| N = 103; D = 34.012499 | M = 92; D = 33.90506 |
| N = 104; D = 34.341767 | M = 93; D = 34.269924 |
| N = 105; D = 34.671035 | M = 94; D = 34.634788 |
| N = 106; D = 35.000303 | M = 95; D = 34.999652 |

Based on a comparison of each of the foregoing five possibilities, it can be readily determined that the minimum error for the distance D occurs at N = 0.106 and M = 95. That is, the difference between the distance D of 35.000303 at N = 106 and the distance D 34.999652 at M = 95 is only 0.00651 of an inch, while the other differences are greater than this value.

In connection with the usage of the apparatus and method of the present invention, several measuring applications are feasible. In one embodiment, for example, the present invention can be utilized to determine the plane of a tire or wheel. In such a case, multiple transducers might be used to define different points on the wheel from which a wheel plane can be defined.

As can be appreciated, it is important that the counter/timer be able to achieve a significantly high resolution. In one embodiment of the invention, the counter/timer is able to achieve resolution within 125 nanoseconds. As a result, the determination of the path or distance can be achieved to an accuracy of 0.001 inches.

Although the afore-discussed preferred embodiment address the use of two different frequencies, more than two frequencies could be utilized for achieving even greater accuracy if desired. By way of example, three different frequencies could be generated.

Based on the foregoing description, a number of worthwhile features of the present invention are immediately recognized. A measuring apparatus and method are provided for determining distance between the apparatus and an object to a high degree of accuracy. Such distance determination can be used in defining a wheel plane. In one application, a wheel plane can be used to determine toe and camber angles of the wheel. The invention relies on the use of at least two different frequencies. A rough or coarse distance determination is made, as well as phase shift determinations to obtain a fine distance, in order to provide an accurate distance measurement. In connection with the determination of phase shifts, a check is made to determine whether a transmit signal is to be inverted before finding an average phase shift. This technique avoids the introduction of errors into the averaging of a number of values of phase shift. The apparatus also compensates for any error due to unwanted phase shifting that occurs in the apparatus itself as the transmitted/received signals pass through the apparatus circuitry. The apparatus of the present invention is used with a "passive" target in that the target merely reflects ultrasonic signals generated by an ultrasonic transducer.

Although the present invention has been described with reference to a number of different possible embodiments, still further changes can be effected within the spirit and scope of this invention.

What is claimed is:

1. A method for measuring the distance to an object, comprising:
   transmitting to the object a transmitted signal having a first frequency;
   a transmitting to the object a transmitted signal having a second frequency, said second frequency being different from said first frequency;
   receiving from the object a returned signal having said first frequency;
   receiving from the object a returned signal having said second frequency;
   determining a first magnitude relating to a coarse distance which relates to the coarse time taken by at least one of said first frequency signal and said second frequency signal to make a round trip to and from the object;
   determining a second magnitude relating to a first fine distance and a first fine time, both of said first fine distance and said first fine time being associated with said first frequency signal;
   determining a third magnitude relating to a second fine distance and a second fine time, both of said second fine distance and said second fine time being associated with said second frequency signal;
   determining a whole number of signal cycles taken by said first frequency signal to make the round trip distance relative to the object and determining a whole number of signal cycles taken by said second frequency signal to make the round trip distance relative to the object, using at least said first magnitude; and
   using said second magnitude, said third magnitude, said whole number of signal cycles taken by said first frequency signal and said whole number of signal cycles taken by said second frequency signal in making a single determination of the distance to the object.

2. A method, as claimed in claim 1, wherein:
   said first fine time associated with first frequency signal relates to the time between zero crossing of said transmitted signal having said first frequency and said returned signal having said first frequency.

3. A method, as claimed in claim 1, wherein: p1 at least one of said step for determining a first magnitude, said step for determining a second magnitude and said step for determining a third magnitude, includes detecting the amplitude of at least a portion of each of said returned signals.

4. A method, as claimed in claim 1, wherein:
   said step of determining a first magnitude relating to said coarse distance includes measuring a propagation time between the sending to the object of a selected part of a transmitted signal and the receiving from the object of portions of said selected part.

5. A method, as claimed in claim 1, wherein:
   said step of determining a second magnitude relating to said first fine distance includes measuring a phase shift between said transmitted first frequency signal and said returned first frequency signal.

6. A method, as claimed in claim 5, wherein:
   said step of measuring a phase shift includes obtaining a number of magnitudes relating to phase shifts associated with said first frequency signal and obtaining an average of said number of magnitudes.

7. A method, as claimed in claim 1, wherein:
   one of said step of determining a second magnitude relating to said first fine distance and said step of determining a third magnitude relating to said second fine distance includes establishing a window used in checking phase shift of at least one of said returned signals.

8. A method, as claimed in claim 6, wherein:
   said step of measuring includes evaluating each of said magnitudes relating to phase shift to determine whether an average should be taken of less than the total number of said magnitudes.

9. A method, as claimed in claim 1, wherein:
   said first frequency is greater than said second frequency.

10. A method, as claimed in claim 1, wherein:
    said first frequency is less than said second frequency.

11. A method, as claimed in claim 7, wherein:
    said transmitted first frequency signal is transmitted in at least two bursts, each of said two bursts including a plurality of periodic cycles, said first burst being used to check said phase shift of said returned first frequency signal.

12. A method for measuring the distance to an object, comprising:
    transmitting to the object a signal having a first frequency;
    transmitting to the object a signal having a second frequency;
    receiving from the object a returned signal having said first frequency;
    receiving from the object a returned signal having said second frequency;
    determining a first magnitude relating to a coarse distance which relates to the time taken by at least one of said first frequency signal and said second frequency signal to make a round trip to and from the object;
    determining a second magnitude relating to a first fine distance associated with said first frequency signal;

determining a third magnitude relating to a second fine distance associated with said second frequency signal;

wherein one of said step of determining a second magnitude and said step of determining a third magnitude includes establishing a window used in checking phase shift of at least one of said returned signals and wherein said transmitted first frequency signal is transmitted in at least two bursts, each of said two bursts including a plurality of periodic cycles, said first burst being used to check said phase shift of said returned first frequency signal;

wherein one of said step of determining a second magnitude and said step of determining a third magnitude includes generating an inverted transmit signal having a first frequency when a phase shift of said first frequency returned signal is outside of said window, said inverted transmit signal being out-of-phase relative to a comparison transmit signal; and using said first, second and third magnitudes to determine the distance to the object.

13. A method for measuring the distance to an object, comprising:
transmitting to the object a transmitted signal having a first frequency;
transmitting to the object a transmitted signal having a second frequency;
receiving from the object a returned signal having said first frequency;
receiving from the object a returned signal having said second frequency;
determining a first magnitude relating to a coarse distance which relates to the time taken by at least one of said first frequency signal and said second frequency signal to make a round trip to and from the object;
determining a second magnitude relating to a first fine distance associated with said first frequency signal;
determining a third magnitude relating to a second fine distance associated with said second frequency signal;
wherein one of said step for determining a second magnitude and said step for determining a third magnitude includes the following steps:
transmitting said first frequency signal in a first set of cycles,
receiving at least some of said first set of signal cycles,
checking whether a magnitude relating to phase shift between said transmitted and received first signal cycles is within a pre-established window relating to magnitudes of phase shifts,
transmitting said first frequency signal in a second set of cycles,
receiving at least some of said second set of signal cycles, and
using an inverted transmit signal in determining phase shift between said transmitted and received second set of signal cycles when said magnitude relating to phase shift is outside of said window, said inverted transmit signal being out-of-phase by a predetermined amount relative to said transmitted first frequency signal; and
using said first, second and third magnitudes to determine the distance to the object.

14. An apparatus for measuring distance to an object, comprising:
means for transmitting a transmitted signal having a first frequency and a transmitted signal having a second frequency;
means for receiving a returned signal having said first frequency and a returned signal having said second frequency; and
means for processing responsive to said means for receiving for determining the distance to the object, said processing means including means for determining a first magnitude relating to propagation time using at least one of said first signal frequency and said second signal frequency, for determining a second magnitude relating to a first fine time for said first frequency signal and for determining a third magnitude relating to a second fine time for said second frequency signal; and
wherein said means for processing includes means for correcting for any phase shift difference between first and second signal frequencies.

15. A method, as claimed in claim 1, wherein:
each of said first frequency signal and said second frequency signal is an ultrasonic signal.

16. A method, as claimed in claim 1, further including:
transmitting a third or more signals, each having a different frequency.

17. A method for measuring the distance to an object, comprising:
transmitting to the object a transmitted signal having a first frequency;
transmitting to the object a transmitted signal having a second frequency;
receiving from the object a returned signal having said first frequency;
receiving from the object a returned signal having said second frequency;
determining a first magnitude relating to a coarse distance which relates to the time taken by at least one of said first frequency signal and said second frequency signal to make a round trip to and from the object;
determining a second magnitude relating to a first fine distance associated with said first frequency signal;
determining a third magnitude relating to a second fine distance associated with said second frequency signal;
wherein one of said step of determining a second magnitude and said step for determining a third magnitude includes correcting for any phase shift difference between returned first and second signal frequencies; and
using said first, second and third magnitudes to determine the distance to the object.

18. An apparatus for measuring distance to an object, comprising:
means for transmitting a transmitted signal having a first frequency and a transmitted signal having a second frequency;
means for receiving a returned signal having said first frequency and a returned signal having said second frequency; and
means for processing responsive to said means for receiving for determining the distance to the object, said processing means including means:
for determining a first magnitude relating to propagation time using at least one of said first signal frequency and said second frequency, for determining a second magnitude relating to a time difference between said transmitted signal and said returned signal, each having said first frequency, for determining a third magnitude relating to a time difference between said transmitted signal and said returned signal, each having said second frequency, for determining a whole number of signal cycles taken by said first frequency signal to make the round trip distance relative to the object and for determining a whole number of signal cycles taken by said second frequency signal to make the round trip distance relative to the object, using said first magnitude; and wherein said processing means uses said second magnitude, said third magnitude, said first whole number of signal cycles and said second whole number of signal cycles to make a single determination of the distance to the object.

19. An apparatus, as claimed in claim 18, wherein:
said means for processing includes means for detecting the amplitude of at least one of said returned first frequency signal and said returned second frequency signal.

20. An apparatus, as claimed in claim 18, wherein:
said means for processing includes means for producing a pulse waveform from each of said returned first frequency and second frequency signals.

21. An apparatus, as claimed in claim 18, wherein:
said means for transmitting includes driver means for providing a voltage of about 140 volts.

22. An apparatus, as claimed in claim 18, wherein:
said means for transmitting and said means for receiving include a single transducer.

23. An apparatus, as claimed in claim 18, wherein:
said means for transmitting includes means for providing a number of signals having different frequencies, each of which is separately transmitted to the object.

24. An apparatus, as claimed in claim 18, wherein:
said means for processing includes means for determining a relative amount of phase shift between a transmitted one of said first and second frequency signals and a returned one of said first and second frequency signals.

25. An apparatus for measuring distance to an object, comprising:

means for transmitting a transmitted signal having a first frequency and a transmitted signal having a second frequency, said means for transmitting including means for providing a number of signals having different frequencies, each of which is separately transmitted to the object, and said means for transmitting including means for generating a digital transmit signal having said first frequency and further including means for generating a digital inverted transmit signal that is out-of-phase relative to said transmit signal;

means for receiving a returned signal having said first frequency and a returned signal having said second frequency; and means for processing responsive to said means for receiving for determining the distance to the object, said processing means including means for determining a first magnitude relating to propagation time using at least one of said first signal frequency and said second signal frequency, for determining a second magnitude relating to a first fine time for said first frequency signal and for determining a third magnitude relating to a second fine time for said second frequency signal.

26. An apparatus, as claimed in claim 18, wherein:
said means for processing includes means for determining a number of parameters and for determining an optimum distance value using said number of parameters.

27. An apparatus, as claimed in claim 18, wherein:
said means for processing includes means for averaging a number of at least one of: said first magnitude relating to said propagation time, said second magnitude relating to a first fine time and said third magnitude relating to a second fine time.

* * * * *